Dec. 27, 1949      E. C. DEMPSEY      2,492,274
AUTOMATIC SHUTOFF FOR STORAGE TANKS OF FLOW LINES
Filed May 16, 1947      2 Sheets-Sheet 2
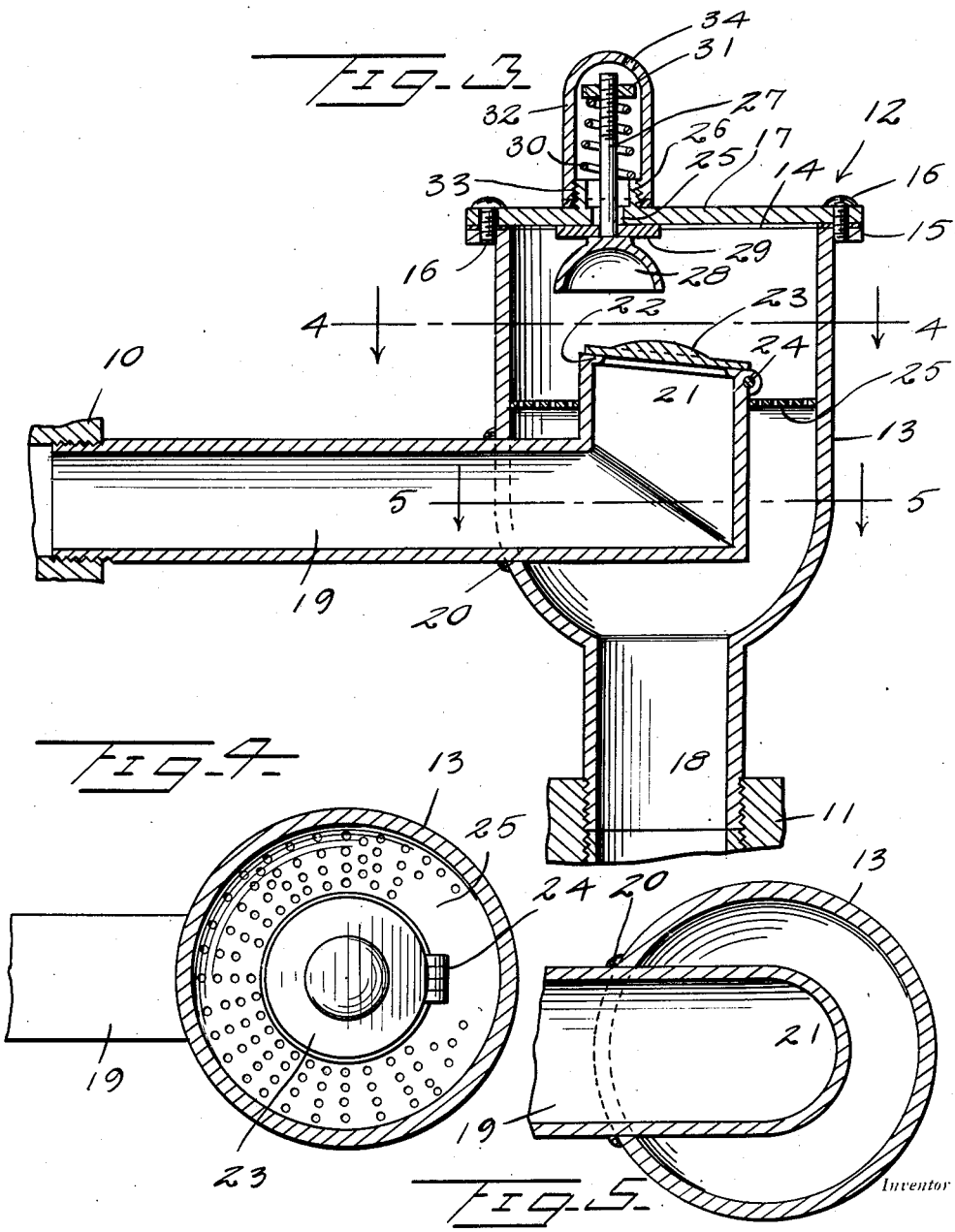
Inventor
Edward C. Dempsey
By Randolph & Beavers
Attorneys Patented Dec. 27, 1949

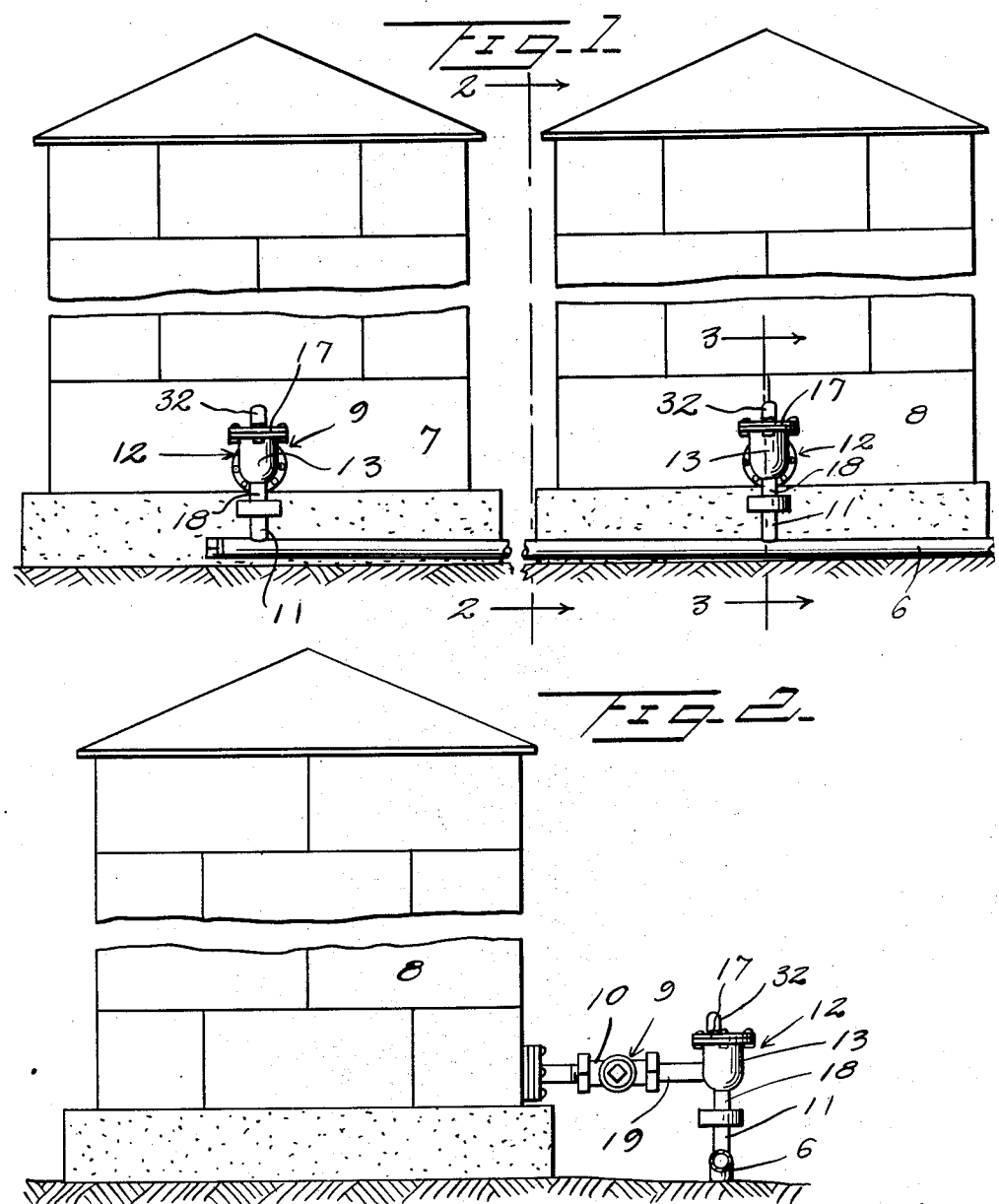

2,492,274

UNITED STATES PATENT OFFICE 2,492,274

AUTOMATIC SHUTOFF FOR STORAGE TANKS OF FLOW LINES

Edward C. Dempsey, Pine Bluff, Ark.

Application May 16, 1947, Serial No. 748,449

3 Claims. (Cl. 277—60)

1

This invention relates to valve means for automatically shutting off the flow from a storage tank to a pipe line when the liquid level in the storage tank falls to below a predetermined point to prevent air from being drawn into the pipe line from the storage tank and producing an airlock in the pipe line which will prevent the flow of liquid from the other tanks in the pipe line.

Still another and important object of the present invention is to provide a shut-off means which will also function to prevent oil from flowing back from the line into the storage tank in the event of an excess flow of oil in a line and should the regular check valve, placed on every running line between the main gravity line and receiving station, fail to operate, thereby eliminating the need for the use of such regular check valves while providing a means positively to prevent oil or liquid from flowing in reverse into and overflowing the storage tanks of the line.

Still another and important object of the invention is to provide a device for the aforedescribed purposes which is adapted to be mounted externally of each storage tank and which may be readily utilized as a part of the conduit between the tank and line and for replacing a conventional L- or T-joint which is conventionally required in such conduit portions.

Still another object of the invention is to provide a device of extremely simple construction which may be economically manufactured and sold and which may be quickly and easily applied to and removed from the conduit connection between a storage tank and pipe line.

Various other objects and advantages of the invention will hereinafter become more fully apparent from the following description of the drawings, illustrating a preferred embodiment thereof, and wherein:

Figure 1 is a side elevational view showing two storage tanks and their connections with a pipe line;

Figure 2 is a view taken substantially at right angles to Figure 1 and along a plane as indicated by the line 2—2 thereof.

Figure 3 is an enlarged vertical sectional view of the shut-off valve, taken substantially along a plane as indicated by the line 3—3 of Figure 1, and Figures 4 and 5 are cross sectional views thereof taken substantially along planes as indicated by the lines 4—4 and 5—5, respectively, of Figure 3.

Referring more specifically to the drawings,

2 for the purpose of illustrating a preferred adaptation and use of the invention as hereinafter to be described, a portion of a pipe line for oil is shown at 6 connected to two storage tanks 7 and 8, which may be disposed at different elevations, by a short, generally L-shaped conduit, each of which conduits is designated generally 9. The conduits 9, as best seen in Figure 2, each includes a generally horizontal portion which extends from the lower part of a storage tank and which terminates in a downturned outer portion which is connected to the pipe line 6. It will be understood that the portion of the pipe line as shown at 6 in Figures 1 and 2 will ordinarily constitute a portion of a branch or lateral line between a group of storage tanks and a main gravity line, not shown, to a receiving station. Said conduits or connections 9 are conventionally provided with a manually operative shut-off valve 10 in the horizontal portion thereof, extending from the storage tanks and are ordinarily provided with an L- or T-joint between the housing of the valve 10 and a pipe section 11, disposed at a right angle thereto and which connects with the pipe line 6. The automatic shut-off means, designated generally 12 and comprising the invention is adapted to be interposed in the conduit 9 between the valve 10 and pipe section 11 to replace the L- or T-joint, not shown, which is conventionally employed and accordingly forms a part of the conduit 9 and which is detachably applied thereto by threaded or other types of connections, as is conventional.

The automatic shut-off valve means 12 includes a bowl 13 provided with an open upper end 14 having an external flange 15 for receiving fastenings 16 by means of which a removable closure or seal 17 is applied thereto. The bowl 13 is provided with a restricted tubular extention 18 at its lower end which is adapted to detachably connect with and open into the conduit portion 11.

The valve 12 also includes a conduit section 19 which is disposed substantially at right angles to the conduit portion 18 and which has an outer end detachably connected to the outer end of the valve housing 10 and an opposite end which extends into the bowl 13 through an opening 20 in one side thereof and which terminates in an upstanding inner end 21 which opens upwardly into the upper portion of the bowl 13 and which is preferably inclined with respect to the horizontal plane thereof. The open upper end 22 of the upstanding upwardly opening conduit portion 21 is provided with a hingedly mounted flap valve 23 which is hingedly connected thereto at 24 and which is mounted to open upwardly in response to a pressure within the conduit 19. An annular filter disc 25 is disposed within the bowl 13, between the side wall thereof and conduit portion 21 so that all oil flowing outwardly through the discharge opening 22 will pass through the filter 25 in descending through the bowl 13 to the tubular outlet conduit 18.

As best seen in Figure 3, the cover or seal 17 is provided with an opening 25 and on the upper side thereof is provided with an upstanding annular flange 26 which surrounds said opening and which is externally threaded. A valve stem 27 extends reciprocally through the opening 25 and the bore of the flange 26 and is provided on its inner end with an inverted, substantially semi-spherical head 28 and carries a disc or washer-type valve 29 which closely engages the stem 27 and bears against the outer, upper side of the head 28. An expansion coil spring 30 is disposed on the stem 27 and has its lower end resting on the upper end of the flange 26 and its upper end bearing against a nut 31 which is adjustably positioned on the upper, threaded end of the stem 27 and which spring 30 functions to urge the valve stem 27 upwardly for normally retaining the valve 29 in its position of Figure 3 for closing the opening 25. An elongated cover 32 is disposed over the upper end of the stem 27 and the spring 30 and nut 31 and has an internally threaded open lower end 33 which engages the external thread of the flange 26 for detachably mounting the cover 32 thereon. The opposite, upper end of the cover 32 is substantially semi-spherical in shape and is closed except for a small vent opening 34 therein.

Assuming that the tank 7 or 8 with which the shut-off valve 12 is associated is substantially filled with oil or other liquid to be dispensed therefrom, not shown, the pressure of the oil in the tank and above the level of the unit 12 will cause said oil to flow outwardly through the horizontal portion of the conduit 9 of said tank past the open valve 10 and through the tube or pipe 19 of said unit 12 for unseating the flap valve 23 which will be forced upwardly by the pressure of the oil to an open position to permit the oil to pass outwardly through the open end 22 of the conduit portion 21 and to thereafter flow downwardly through the filter 25 of the bowl 13 through the tube portion 18 thereof and the conduit portion 11 into the flow line 6. As clearly illustrated in Figure 3, the valve head 28 is located to afford a stop for the upward swinging movement of the flap valve 23 toward an open position and functions to prevent said valve from moving to or beyond a dead center position, and the pressure on the under side of the flap valve 23, when liquid is being dispensed from the tank to which the unit 12 is connected, will cooperate with the spring 30 for retaining the valve in a closed position. When the level of the liquid or oil in the tank to which the unit 12 is connected falls to below the level of the open end 22 of the pipe 19, the valve 23 will return by gravity to a closed position thereby maintaining a liquid seal in said tank and to prevent air from being drawn from the tank through the unit 12 and into the line 6 so as to create an air-lock in the pipe line. Should a suction result in the pipe line 6, additional oil or liquid will not be drawn from the tank due to the fact that the valve stem 27 will be drawn downwardly by a vacuum in the bowl 13 to admit air thereto through the vent opening 34 and the valve opening 25 thus assuring the maintenance of a liquid seal at all times in the storage tank.

Should the conventional check valve, not shown, ordinarily provided in the pipe line 6 between the storage tank and the main gravity line to the receiving station remain open for any cause after the supply of a tank has been exhausted and should a subsequent back pressure occur in the pipe line or a portion thereof so as to cause the oil to ordinarily flow back into a storage tank, as frequently occurs and which results in overflowing of storage tanks, the back pressure of the oil in the unit 12 will maintain the flap valve 23 in a closed position and as the valve 29 will also be in closed position, it will be readily apparent that said unit 12 will function as an automatic stop valve to prevent a reverse flow of the oil through the connection 9 and into the storage tank, and it will therefore be readily apparent that such check valve in the pipe line may be dispensed with, if desired.

Various modifications and changes are contemplated and may obviously be resorted to, without departing from the spirit or scope of the invention as hereinafter defined by the appended claims.

I claim as my invention:

1. A safety shut-off valve for storage tanks of pipe lines comprising a bowl having a downwardly opening outlet end adapted to be connected to a conduit leading to a pipe line, a conduit having one end adapted to be connected to a conduit leading from a storage tank and provided with an opposite end extending into said enlarged conduit and opening upwardly therein, an upwardly opening flap valve for closing said last mentioned, upwardly opening end of the conduit, the upper end of said bowl being sealed by a removable cover affording access to the interior thereof when the cover is removed, and vent means, including a normally closed valve, carried by said cover and adapted to be opened in response to a vacuum in the bowl to prevent opening of the flap valve in response to a suction in the pipe line.

2. A safety shut-off valve for storage tanks of pipe lines comprising a bowl having a downwardly opening outlet end adapted to be connected to a conduit leading to a pipe line, a conduit having one end adapted to be connected to a conduit leading from a storage tank and provided with an opposite end extending into said enlarged conduit and opening upwardly therein, an upwardly opening flap valve for closing said last mentioned, upwardly opening end of the conduit, the upper end of said bowl being sealed by a removable cover affording access to the interior thereof when the cover is removed, vent means, including a normally closed valve, carried by said cover and adapted to be opened in response to a vacuum in the bowl to prevent opening of the flap valve in response to a suction in the pipe line, and means for varying the suction required to open said last mentioned valve.

3. A safety shut-off valve for storage tanks of pipe lines comprising a bowl having a downwardly opening outlet end adapted to be connected to a conduit leading to a pipe line, a conduit having one end adapted to be connected to a conduit leading from a storage tank and provided with an opposite end extending into said enlarged conduit and opening upwardly therein, an upwardly opening flap valve for closing said last mentioned, upwardly opening end of the conduit, the upper end of said bowl being sealed by a removable cover affording access to the interior thereof when the cover is removed, and a vacuum responsive valve carried by said cover and adapted to be opened in response to a vacuum in the bowl to prevent bleeding of the storage tank by a suction in the pipe line; said vacuum responsive valve including a flanged externally threaded opennig formed in said cover and externally thereof, a valve stem extending reciprocally through said opening and having a valve head on the inner end thereof for closing the opening when the valve stem is in an extended position, an expansion spring carried by the valve stem and having one end bearing on the upper end of said flanged opening, a nut adjustably carried by the upper end of the valve stem and forming a seat for the opposite end of the spring, and an elongated closure having an open lower end threadedly connected to the flange of said opening for enclosing the valve stem, spring and nut and provided with a vent opening communicating with the atmosphere.

EDWARD C. DEMPSEY.

REFERENCES CITED

The following references are of record in the file of this patent:

UNITED STATES PATENTS

| Number | Name | Date |
| --- | --- | --- |
| 1,240,265 | Stilwell | Sept. 18, 1917 |
| 2,037,023 | Holby | Apr. 14, 1936 |